(12) United States Patent
Kawagishi et al.

(10) Patent No.: US 7,749,167 B2
(45) Date of Patent: *Jul. 6, 2010

(54) APPARATUS AND METHOD FOR ULTRASONIC DIAGNOSTIC IMAGING

(75) Inventors: Tetsuya Kawagishi, Tochigi-ken (JP);
Yoshitaka Mine, Tochigi-ken (JP);
Koichiro Kurita, Tochigi-ken (JP);
Masamichi Oyanagi, Tochigi-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 11/296,207

(22) Filed: Dec. 8, 2005

(65) Prior Publication Data
US 2006/0086187 A1    Apr. 27, 2006

Related U.S. Application Data

(63) Continuation of application No. 10/359,681, filed on Feb. 7, 2003, now Pat. No. 7,044,914.

(30) Foreign Application Priority Data
Feb. 8, 2002    (JP) ............................. 2002-032770

(51) Int. Cl.
*A61B 8/00*    (2006.01)
(52) U.S. Cl. ................. 600/458; 600/440; 600/441; 600/442; 600/443; 600/447; 600/456
(58) Field of Classification Search ......... 600/440–443, 600/447, 458
See application file for complete search history.

(56) References Cited

U.S. PATENT DOCUMENTS

| | | | |
|---|---|---|---|
| 5,577,505 A | 11/1996 | Brock-Fisher et al. |
| 5,632,277 A | 5/1997 | Chapman et al. |
| 5,706,819 A | 1/1998 | Hwang et al. |
| 5,724,976 A | 3/1998 | Mine et al. |
| 5,879,303 A | 3/1999 | Averkiou et al. |
| 5,928,151 A | 7/1999 | Hossack et al. |
| 5,961,464 A | 10/1999 | Poland |
| 6,193,662 B1 | 2/2001 | Hwang |
| 6,514,206 B2 | 2/2003 | Maxwell et al. |
| 6,656,123 B2 | 12/2003 | Jensen et al. |

*Primary Examiner*—Brian Casler
*Assistant Examiner*—John F Ramirez
(74) *Attorney, Agent, or Firm*—Oblon, Spivak, McClelland, Maier & Neustadt, L.L.P.

(57) ABSTRACT

An ultrasonic diagnosis apparatus and method wherein both imaging of a contrast effect and imaging of a tissue appearance before and after inflow of a contrast medium can be realized on condition that low-power transmission and a high frame rate are maintained. The ultrasonic diagnostic apparatus includes a transmission/reception unit for transmitting subject ultrasonic waves with a band substantially centered at a fundamental frequency and generating a received signal based on an ultrasonic echo from the subject, a harmonic unit for extracting a signal of a harmonic component of the fundamental frequency included in the received signal and extracting a signal of the fundamental component with the band substantially centered the fundamental frequency included in the received signal, and a display unit for generating a display image based on the extracted harmonic and fundamental components.

3 Claims, 12 Drawing Sheets

POSITIVE POLARITY
BEFORE ADDITION

FIG. 4A

NEGATIVE POLARITY
BEFORE ADDITION

APPARATUS AND METHOD FOR ULTRASONIC DIAGNOSTIC IMAGING

CROSS-REFERENCE TO RELATED APPLICATIONS

This application is a continuation of co-pending U.S. patent application Ser. No. 10/359,681, filed Feb. 7, 2003, which is based upon and claims the benefit of priority from the prior Japanese Patent Application No. 2002-32770, filed Feb. 8, 2002, the entire contents of each of which are incorporated herein by reference.

BACKGROUND OF THE INVENTION

1. Field of the Invention

This invention relates to an ultrasonic diagnostic apparatus, and particularly to a contrast medium imaging technique.

2. Description of the Related Art

Microbubbles contained in a contrast medium used for ultrasonic diagnosis are collapsed by ultrasonic transmission and tend be collapsed when the transmitted sound pressure is higher. To maintain a contrast effect, a certain measure needs to be taken such as imaging a contrast medium while suppressing its collapse by using a low sound pressure (real-time perfusion image or RPI).

The case of extracting a second harmonic component of a transmitted fundamental wave from a received echo in RPI will now be considered. When the sound pressure is high, the second harmonic component contains a nonlinear propagation component generated in the tissue.

When the sound pressure is low as in RPI, the nonlinear propagation component generated from the tissue has very low intensity, which is insufficient for imaging. A tissue image can hardly be observed before inflow of a contrast medium, and only after inflow of the contrast medium, a harmonic component due to the contrast medium begins to appear.

In short, in the ultrasonic test using a contrast medium, when the sound pressure is lowered to maintain the contrast effect, a nonlinear propagation component generated in the tissue has very low intensity and therefore a tissue image hardly appears before inflow of the contrast medium. On the other hand, when the sound pressure is raised to enable appearance of the nonlinear propagation component generated from the tissue before inflow of the contrast medium, the contrast effect momentarily disappears. Particularly, this problem is noticeable at the time of ultra-low sound pressure driving where an MI (mechanical index) value, which is an index showing an output reference obtained by normalizing a maximum peak negative sound pressure in a transmitted beam by the square root of the fundamental frequency, is approximately 0.1.

To solve this problem, it may be conceivable to use a conventional color Doppler processing unit to prepare and display a B mode with a fundamental wave as a tissue (background) image and to display a Doppler image (including phase inversion Doppler) as a contrast image. However, since separate transmissions and receptions are necessary for the tissue and for the contrast, respectively, the frame rate, which is particularly important for imaging a cardiovascular system, is lowered and the real-time property cannot be utilized. Moreover, the transmission for the tissue may cause unwanted collapse of and adverse effects on the contrast medium.

When an image is generated using only a harmonic component with a low MI value, even if contrast-enhancement is performed, the brightness of the image is low and it may be difficult to confirm the enhanced region. If the gain is increased only to increase the brightness, noise appears in the image. Even if the dynamic range is narrowed to brighten a maximum brightness part, only a part having relatively high brightness is emphasized and the contrast-enhancement cannot be correctly evaluated.

BRIEF SUMMARY OF THE INVENTION

It is an object of this invention to realize both imaging of a contrast effect and imaging of a tissue appearance before and after inflow of a contrast medium on condition that low-power transmission and a high frame rate are maintained in an ultrasonic diagnostic apparatus.

It is accordingly an aspect of the present invention to provide an ultrasonic diagnostic apparatus, including a transmitter configured to transmit a first ultrasonic wave and a second ultrasonic wave for each scan line, the first and second ultrasonic waves having a common predetermined fundamental frequency in their frequency bands and at least one different condition other than frequency; a receiver configured to receive first and second echo signals reflected from the object body in response to the first and second ultrasonic waves, respectively, and to generate first and second reception signals based on the first and second echo signals; a harmonic component extracting unit configured to extract a harmonic component of the fundamental frequency from the first and second reception signals; a fundamental component extracting unit configured to extract a fundamental component from at least one of the first and second reception signals; an image processor configured to produce the ultrasonic image based on the harmonic component and the fundamental component; and a display configured to display the ultrasonic image.

According to another aspect of the invention, there is provided an ultrasonic diagnostic apparatus including a transmitter configured to transmitting an ultrasonic wave; a receiver configured to receive an echo signal reflected from the object body in response to the ultrasonic wave and to generate a reception signal based on the echo signal; a filter having pass bands such that a fundamental component and a harmonic component in the reception signal are extracted, respectively, wherein a relative intensity of the harmonic signal is larger than the intensity of the fundamental component; an image processor configured to produce the ultrasonic image based on the harmonic component and the fundamental component; and a display configured to display the ultrasonic image.

According to yet another aspect of the invention, there is provided an ultrasonic diagnostic method including the steps of transmitting a first ultrasonic wave and a second ultrasonic wave for each scan line, the first and second ultrasonic waves having a common predetermined fundamental frequency in their frequency bands and different conditions other than frequency; receiving the first and second echo signals reflected from the object body in response to the first and second ultrasonic waves, respectively, and generating first and second reception signals based on the first and second echo signals; extracting a harmonic component of the fundamental frequency from the first and second reception signals; extracting a fundamental component from at least one of the first and second reception signals; producing the ultrasonic image based on the harmonic component and the fundamental component; and displaying the ultrasonic image.

According to yet another aspect of the invention, there is provided an ultrasonic diagnostic method including the steps of transmitting an ultrasonic wave; receiving an echo signal reflected from the object body in response to the ultrasonic wave and generating a reception signal based on the echo signal; filtering the reception signal such that a fundamental component and a harmonic component in the reception signal are extracted, wherein a relative intensity of the harmonic signal is larger than the intensity of the fundamental component; producing the ultrasonic image based on the harmonic component and the fundamental component; and displaying the ultrasonic image.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DESCRIPTION OF THE PREFERRED EMBODIMENTS

Referring now to the drawings, wherein like reference numerals designate the same or corresponding parts throughout the several views, various embodiments of this invention will now be described.

Figure 1:
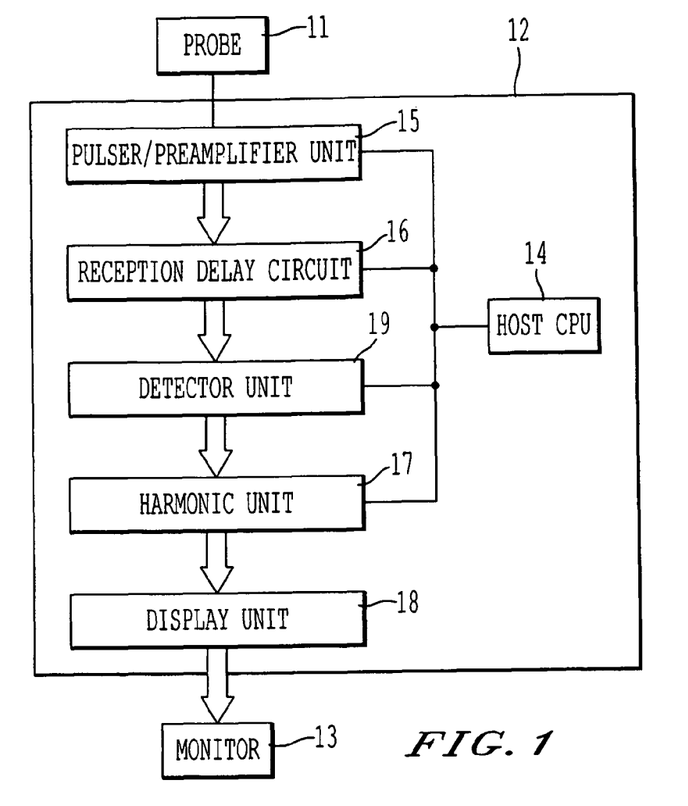
FIG. 1 is a block diagram of an ultrasonic diagnostic apparatus of an embodiment of the invention.

FIG. 1 shows a structure of an ultrasonic diagnostic apparatus according to one embodiment. Reference numeral 11 denotes an ultrasonic probe including plural transducer elements (electroacoustic transducer elements) arranged one-dimensionally or two-dimensionally and typically utilizing a piezoelectric effect. The ultrasonic probe 11 is connected to an apparatus body 12 having a host CPU 14 as its main part, via a connector, not shown. One or neighboring several transducer elements constitute one channel. It is now assumed that one transducer element constitute one channel. To the transducer elements of this ultrasonic probe 11, transmission pulse voltage is applied from a pulser/preamplifier unit 15 under a transmission condition that MI is 0.6 or less. The transducer elements convert the electrical oscillation to mechanical vibration. This causes generation of ultrasonic waves having a frequency band centering a fundamental frequency $\omega 1$ from the transducer elements. The pulser/preamplifier unit 15 provides a time difference between channels with respect to the application timing of the transmission pulse voltage. This time difference (delay time) is provided for focusing the ultrasonic waves generated from the plural transducer elements and for deflecting the focused ultrasonic waves. By changing this delay time, it is possible to arbitrarily change the focal length and the deflection angle (direction of transmission).

Ultrasonic waves are transmitted to a subject from the probe 11 connected to the apparatus body 12. The ultrasonic waves are reflected back to the probe 11 as an echo and are converted to electric signals by the transducer elements. This echo includes a fundamental component of a band centered at the fundamental wave, and a harmonic component of a band centered at a frequency that is an integral multiple of the fundamental frequency, in this case, twice the fundamental frequency. In the case a contrast medium (microbubbles) has been injected in the subject, nonlinear oscillation of the contrast medium generates a harmonic component. The echo of the contrast medium having the fundamental component centered at the fundamental frequency $\omega 1$ and the harmonic component centered at a frequency that is an integral multiple (twice or more) of the fundamental frequency is received by the same probe 11.

This electric signal is sent as a received signal to a harmonic unit 17 via the pulser-preamplifier unit 15, a reception delay circuit 16 and a phase detector unit 19. Through this phase detection (quadrature detection), a carrier component becomes a DC component having a phase. This phase detection processing may be performed in the harmonic unit 17. The reception delay circuit 16 is configured to perform beam forming (phasing addition processing) in reception and controlling the direction and convergence of an ultrasonic beam. The reception delay circuit 16 may include plural circuit sets in order to form plural beams and simultaneously receive the ultrasonic beams in parallel. The received signal is sampled with a sampling frequency suitable for signal processing and then converted to a digital signal, thus forming a beam.

The harmonic unit 17 generates harmonic image data from the harmonic component substantially centered at a frequency that is an integral multiple (in this case, twice) of the fundamental frequency included in the received signal, and also generates fundamental image data from the fundamental component substantially centered at the fundamental frequency included in the same received signal. These two types of image data generated by the harmonic unit 17, that is, the harmonic image data and the fundamental image data, are converted to display data of one frame by a display unit 18 and simultaneously displayed on a monitor 13.

A characteristic feature of this embodiment is that the harmonic component substantially centered at the frequency that is an integral multiple of the fundamental frequency and the fundamental component substantially centered at the fundamental frequency are extracted from the same received signal to generate harmonic image data and the fundamental image data, respectively, and simultaneously display these data.

With the harmonic image after inflow of the contrast medium, its enhancement can be visually confirmed properly. Moreover, the low-power transmission adjusted to such a level as to continuously maintain the contrast effect has a problem that the harmonic component from the tissue has very low intensity before inflow of the contrast medium and that the tissue appearance can hardly be visually confirmed, whereas in this embodiment, since the fundamental image is generated using the fundamental component having signal intensity that is approximately several ten times or several hundred times that of the harmonic component and the fundamental image is displayed together with the harmonic image, the tissue appearance can be confirmed using the fundamental image even before inflow of the contrast medium. In addition, since these two types of image data are generated from the same received signal, the frame rate is not lowered. Furthermore, since increase in brightness due to the contrast effect occurs both in the harmonic image and the fundamental image, the visibility of the enhanced part is improved in comparison with the case of imaging with only the harmonic image.

In this embodiment, plural types of techniques to generate harmonic image data and to generate fundamental image data by the harmonic unit 17 are provided together with corresponding transmission/reception techniques. One of these techniques may be employed. Alternatively, all these techniques or an arbitrary combination of these may be provided in the apparatus to enable selective use. The respective techniques will now be described in order.

(Phase Inversion/Filter Method)

Figure 3A:
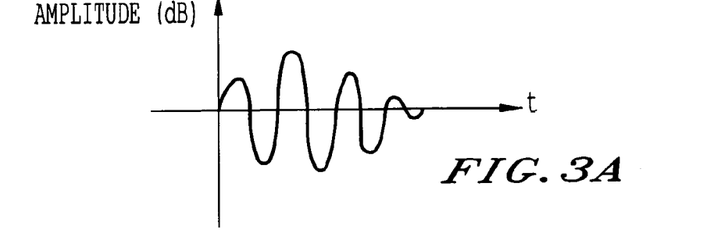
FIGS. 3A-3B are illustrations of an example of a set of transmission ultrasound waves for a Pulse Inversion method.
Figure 3B:
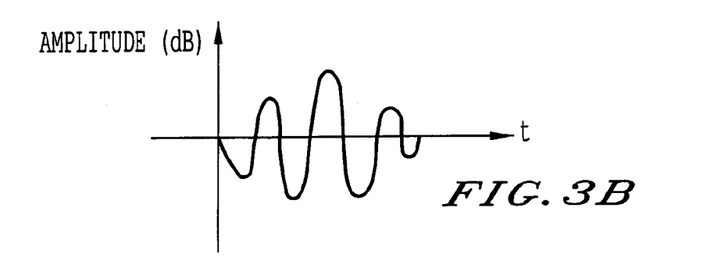

In this phase inversion/filter method, a harmonic component is extracted by a phase inversion method, theoretically without including a residual fundamental component, while a fundamental component is extracted by a filter. In the phase inversion method, transmission of ultrasonic waves and reception of echo are carried out twice on each ultrasonic scanning line. In one transmission, ultrasonic waves are transmitted with a positive waveform as shown in FIG. 3A. In the other transmission, ultrasonic waves are transmitted with a negative waveform as shown in FIG. 3B. In other words, there is a 180 degree phase difference between the first and the second ultrasonic waves.

Figure 4A:
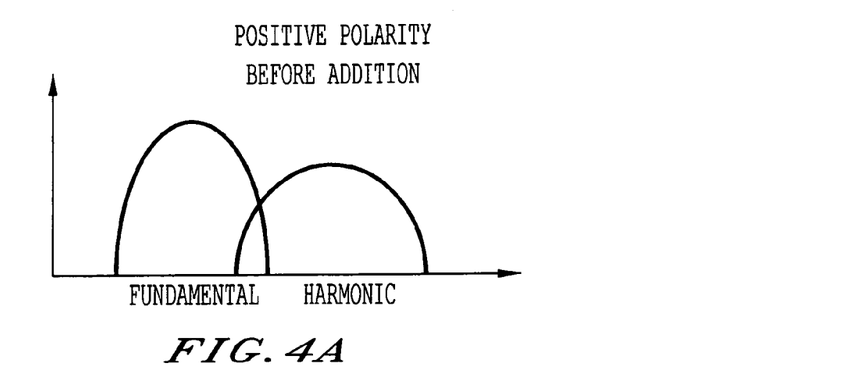
FIGS. 4A-4B show spectrums of received signals in the Phase Inversion method.
Figure 4B:
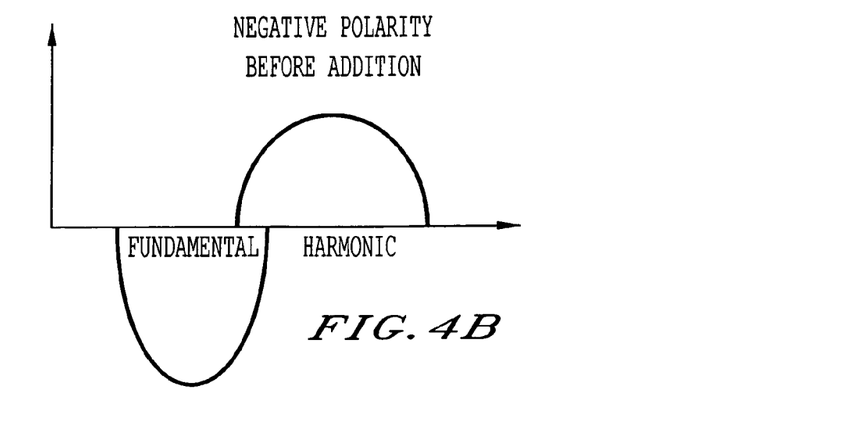

FIG. 4A shows the spectrum of a received signal received from the positive transmission. FIG. 4B shows the spectrum of a received signal received from the negative transmission. As is already known, a nonlinear phenomenon can be approximated as a square of the fundamental wave. When the fundamental wave is expressed by $a(t)\sin \omega t$, the nonlinearity is approximated as $(a(t)\sin \omega t)^2$. Therefore, the harmonic component is generated with the positive polarity both in positive and negative transmissions, whereas the fundamental component is generated with the positive/negative polarity inverted depending on the transmission polarity.

Figure 2:
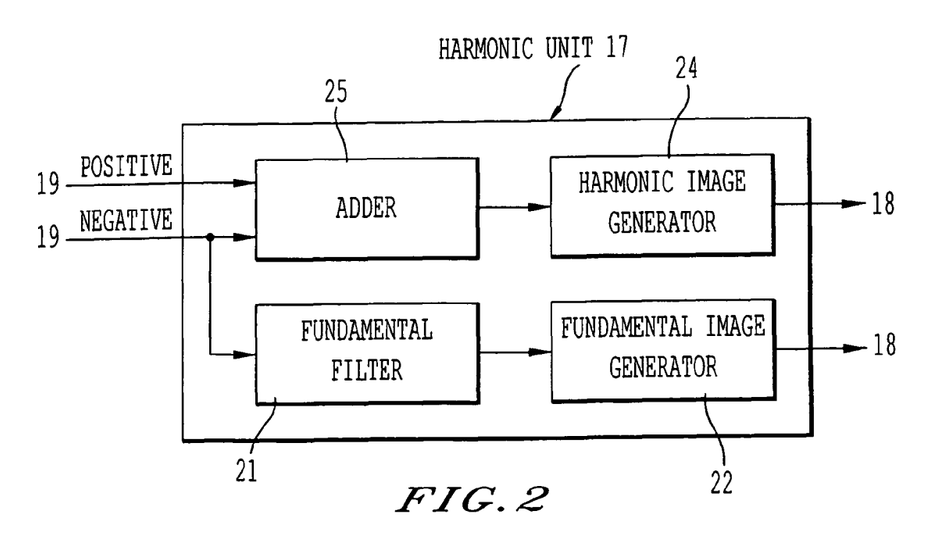
FIG. 2 shows a block diagram of a harmonic unit for a Phase Inversion/Filter method of the invention.
Figure 5A:
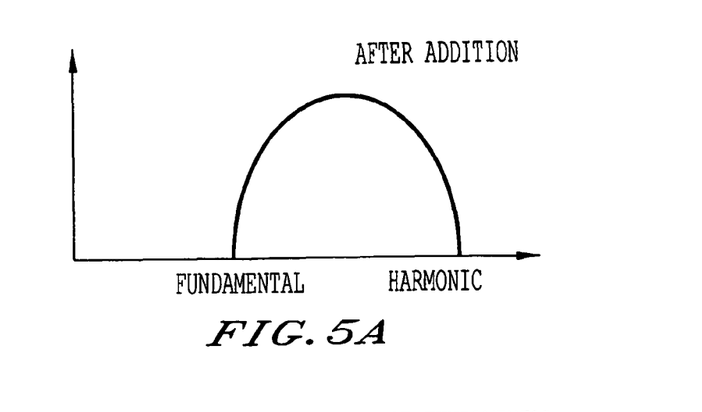
FIGS. 5A-5B are illustrations of extracted harmonic and fundamental components in the Phase Inversion/Filter method.
Figure 5B:
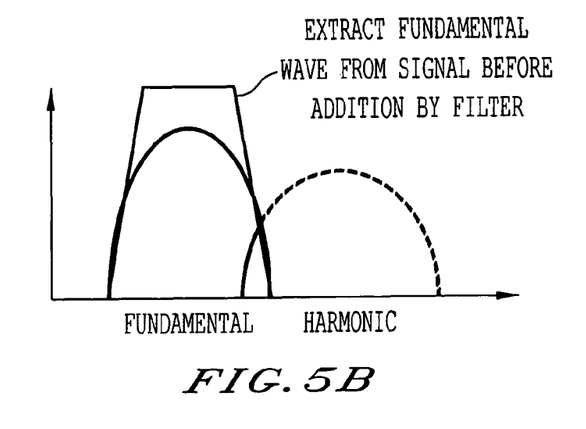

By adding the received signal due to the two positive and negative transmissions at an adder 25 as shown in FIG. 2, it becomes possible to eliminate the fundamental component as shown in FIG. 5A and extract the harmonic component with its intensity substantially doubled. A filter using, as its passband, a band centered or substantially centered at a high frequency that is an integral multiple of the fundamental frequency or an arbitrary band may be arranged on the subsequent stage of the adder 25, thus controlling the band for imaging. Meanwhile, in FIG. 2, the fundamental component is extracted from the received signal of the negative transmission pulse, using the filter method. However, the fundamental component may be extracted from the positive-side signal.

(Phase Inversion Method)

In the above-described phase inversion/filter method, the fundamental component is extracted by a filter. However, the fundamental component may also be extracted by the phase inversion method.

Figure 6:
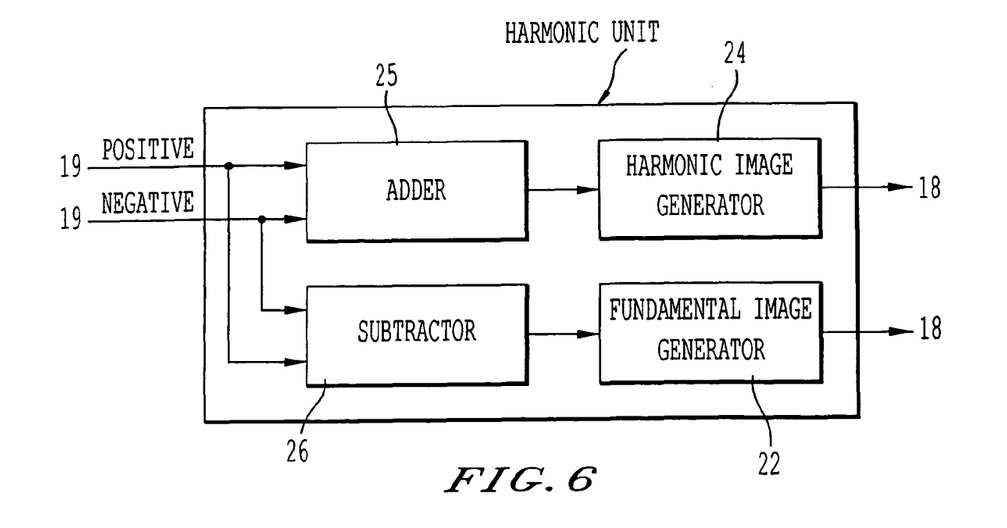
FIG. 6 is a block diagram of a harmonic unit for the Phase Inversion method of the invention.
Figure 7:
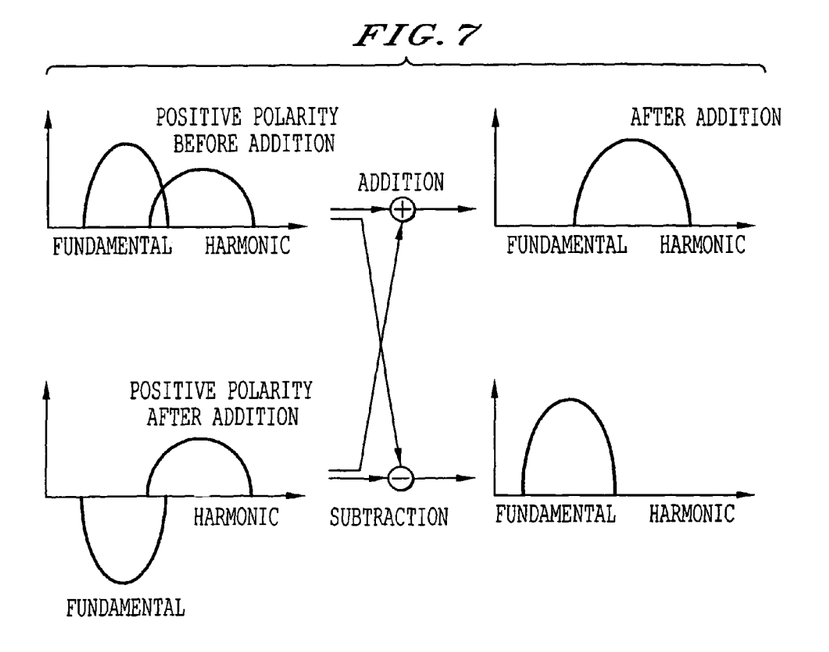
FIG. 7 is an illustration of processing in the Phase Inversion method.

Previously, utilizing the characteristic that the harmonic component is constantly generated with positive polarity, the fundamental component is eliminated by adding the received signals of the two positive and negative transmissions at the adder 25, thus extracting the harmonic component. However, since the fundamental component is generated depending on the transmission polarity, the harmonic component may be eliminated by subtracting the received signals of the two positive and negative transmissions at a subtractor 26, thus extracting the fundamental, as shown in FIGS. 6 and 7.

A filter using, as its passband, a band centered or substantially centered at the fundamental frequency or an arbitrary band may be arranged on the subsequent stage of the subtractor 26, thus controlling the band for imaging.

(Pulse Modulation Method)

As is already known, a harmonic component has lower intensity than a fundamental component. Under a transmission condition that MI is 0.1 or less, a slight fundamental component is generated but little harmonic component is generated. A technique to extract a harmonic component using this characteristic is a pulse modulation method.

Figure 9A:
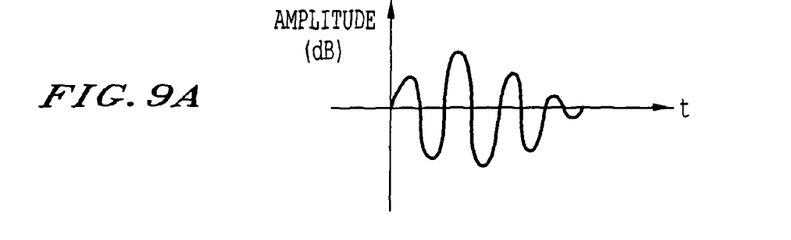
FIGS. 9A-9B are illustrations of an example of a set of transmission ultrasound waves for the Pulse Modulation method.
Figure 9B:
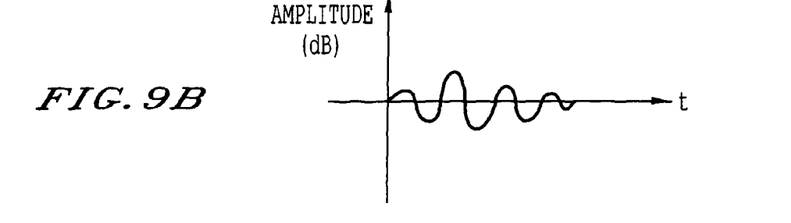

In the pulse modulation method, transmission and reception are carried out twice on each ultrasonic scanning line. In one transmission, ultrasonic waves are transmitted with a relatively high amptitude (high sound pressure) as shown in FIG. 9A under a transmission condition that MI is, for example, 0.6 or less. In the other transmission, ultrasonic waves are transmitted with a relatively low amplitude (low sound pressure) as shown in FIG. 9B under a transmission condition that MI is, for example, 0.1 or less.

Figure 10A:
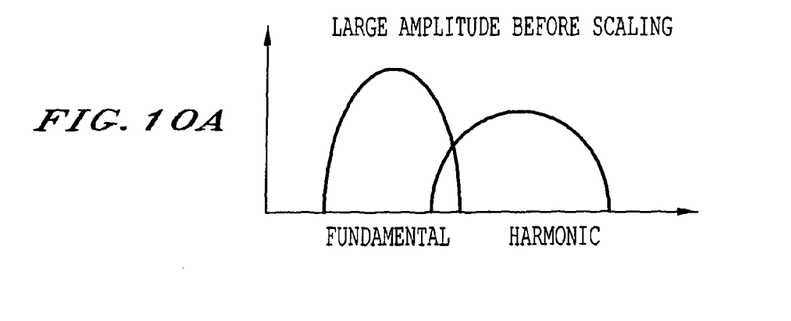
FIGS. 10A-10B show spectrums of received signals in the Pulse Modulation method.
Figure 10B:
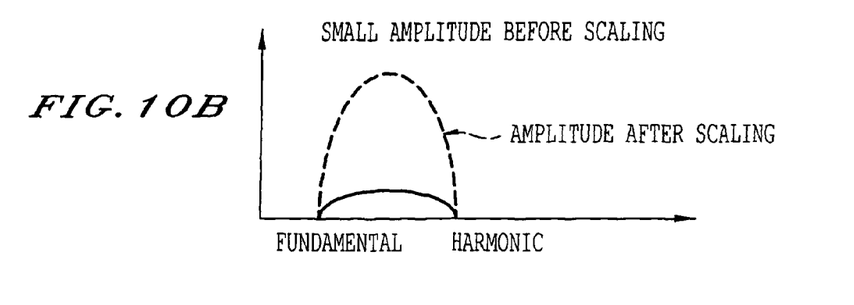

FIG. 10A shows the spectrum of a received signal of a transmitted pulse with the relatively high amplitude. FIG. 10B shows the spectrum of a received signal of a transmitted pulse with the relatively low amplitude. In the transmission with the relatively high amplitude, the received signal includes a fundamental component and a harmonic component. In the transmission with the relatively low amplitude, the received signal includes a fundamental component with low intensity and a harmonic component with extremely low intensity that is equivalent to zero.

Figure 8:
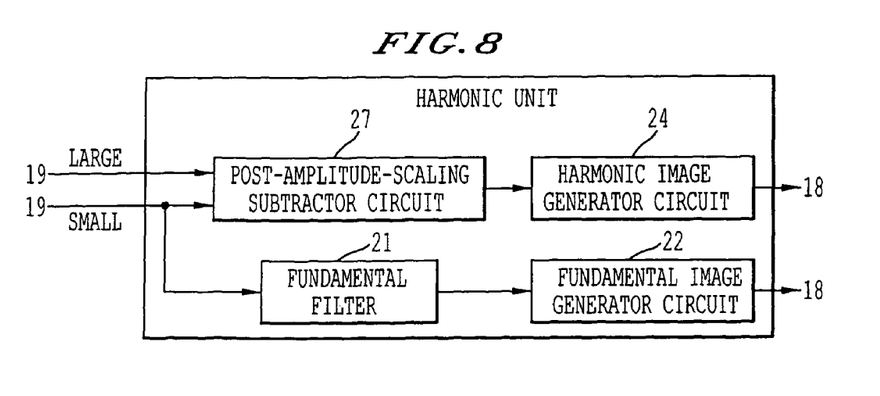
FIG. 8 is a block diagram of a harmonic unit for a Pulse Modulation method using a filter.
Figure 11A:
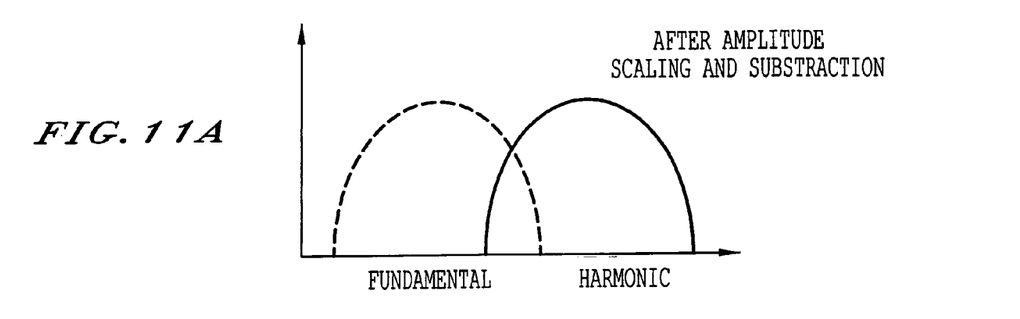
FIGS. 11A-11B are illustrations of extracted harmonic and fundamental components in the Pulse Modulation method.
Figure 11B:
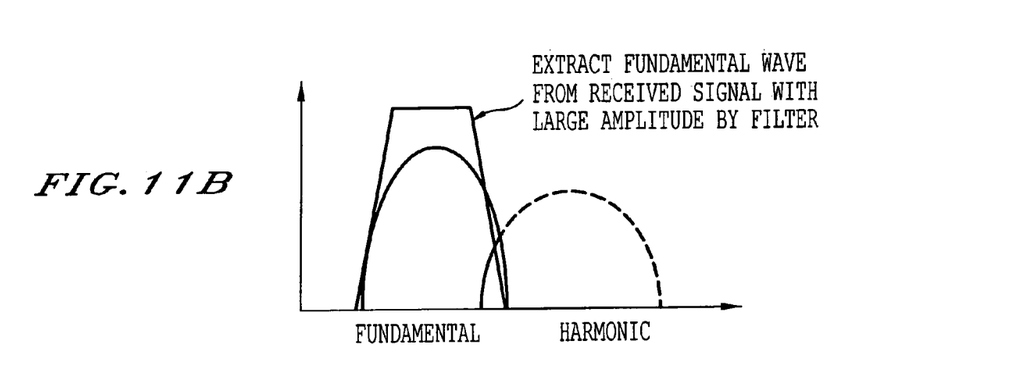

By scaling the received signal of the transmitted pulse with the relatively low amplitude using a transmitted sound pressure ratio of the sound pressure with the high amplitude to the sound pressure with the low amplitude (that is, multiplying the transmitted sound pressure ratio to equalize the reference amplitude) as shown in FIG. 8, and subtracting the result from the received signal of the transmission with the relatively high amplitude at a post-amplitude-scaling subtractor circuit 27, it is possible theoretically to eliminate the fundamental component and extract the harmonic component, as shown in FIG. 11A.

Meanwhile, the fundamental component is extracted from the received signal of the transmitted pulse with the relatively high amplitude by the filter. Alternatively, the received signal of the transmitted pulse with the relatively low amplitude after the scaling may be passed through the filter 21.

(Balance Change Method)

Figure 12:
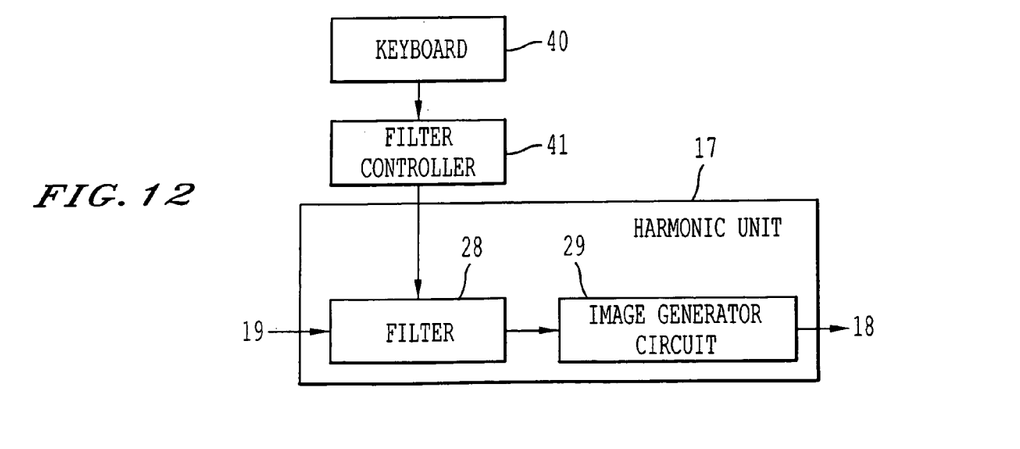
FIG. 12 is a block diagram of a harmonic unit for a Balance Change method of the invention.

FIG. 12 shows an exemplary structure of the harmonic unit 17 corresponding to a balance change method in the above-described techniques, the harmonic component and the fundamental component are separately extracted from the received signal, and also in the image generation processing their respective image data are generated using separate parameters.

Figure 13A:
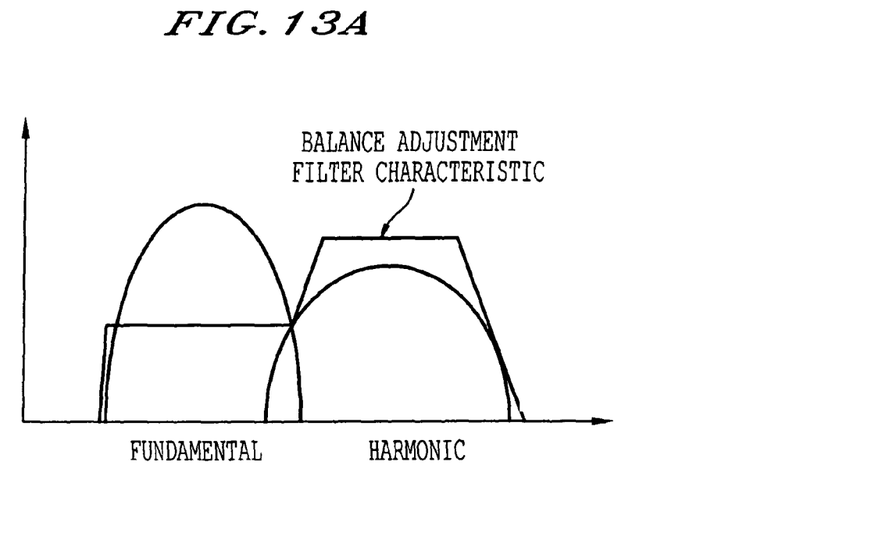
FIGS. 13A-13B are illustrations of a process in the Balance Change method.
Figure 13B:
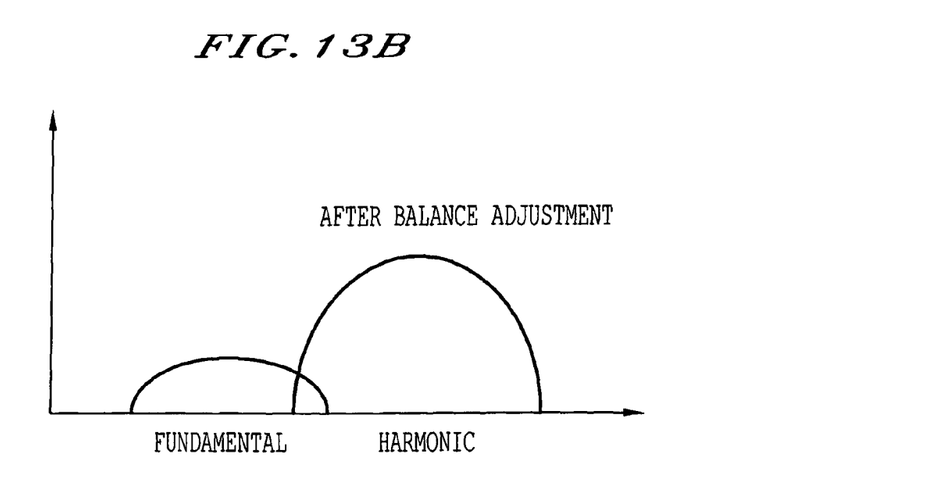

On the other hand, in the balance change method, by passing the received signal through a filter 28 for attenuating a band of a fundamental component shown in FIG. 13A and relatively amplifying a band of a harmonic component, it is possible to adjust the relative relation of intensity between the harmonic component and the fundamental component as shown in FIG. 13B and thus extract a noticeable contrast echo. The filter 28 uses a complex digital filter having an asymmetric frequency passing characteristic. The passing rate of the fundamental component and the harmonic component can he arbitrarily changed using a keyboard 40, a volume control or the like on an operating panel. When an operator changes a parameter related to the rate of the fundamental component and the harmonic component using the keyboard 40 or the like on the operating panel, a filter coefficient corresponding to the parameter is set for the filter 28 under the control of a filter controller 41, thus changing the passing rate of the fundamental component and the harmonic component.

In this balance change method, it suffices to transmit and receive ultrasonic waves only once on each ultrasonic scanning line and a high frame rate can be secured.

The balance change method can also be applied to the phase inversion method. Specifically, after the intensity of the fundamental component is made lower than that of the harmonic component through a filter for attenuating the band of the fundamental component of one echo signal and relatively amplifying the band of the harmonic component, addition is performed.

As described above, in the techniques other than the balance change method, the fundamental image data and the harmonic image data are separately generated. Therefore, various variations can be provided for image display. As typical display modes, eight types of display modes, that is, first to eighth display modes will be described hereinafter. An operator can arbitrarily select one of these eight types of first to eighth display modes.

Figure 14:
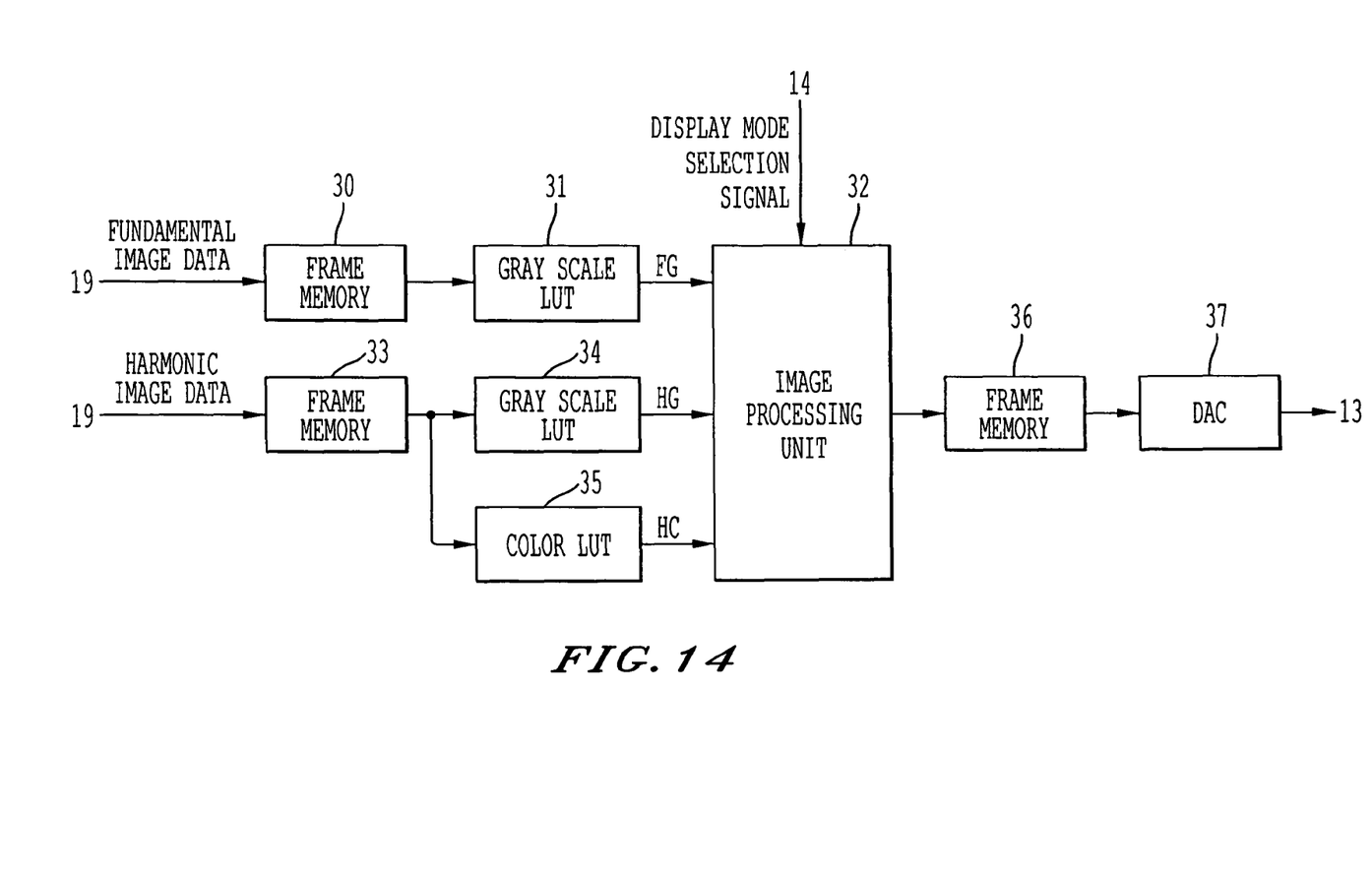
FIG. 14 is a block diagram of a display unit of an embodiment of the invention.

FIG. 14 shows a structure of the display unit 18. Fundamental image data are converted to fundamental image data expressed by gray scale (hereinafter referred to as FG) by a frame memory 30 and a gray scale lookup table (LUT) 31 and then sent to an image processing unit 32. Harmonic image data are converted to harmonic image data expressed by gray scale (hereinafter referred to as HG) by a frame memory 33 and a gray scale lookup table 34 and then sent to the image processing unit 32. The harmonic image data are also converted to harmonic image data of color expression (hereinafter referred to as HC) by a color lookup table 35 and then similarly sent to the image processing unit 32. The color lookup table 35 assigns colors in accordance with the power value of the harmonic image data so that, for example, red is assigned for a small power value and color gradually changes to yellow as the power value increases.

The image processing unit 32 generates display data corresponding to a display mode designated by the operator, from these three types of image data FG, HC and HC. Scan conversion of the display data is performed by a frame memory 36 on the output stage. The resulting display data is passed through a digital analog converter (DAC) 37 and outputted to the monitor 13. A number of display modes will now be described in order.

(First Display Mode)

Figure 15:
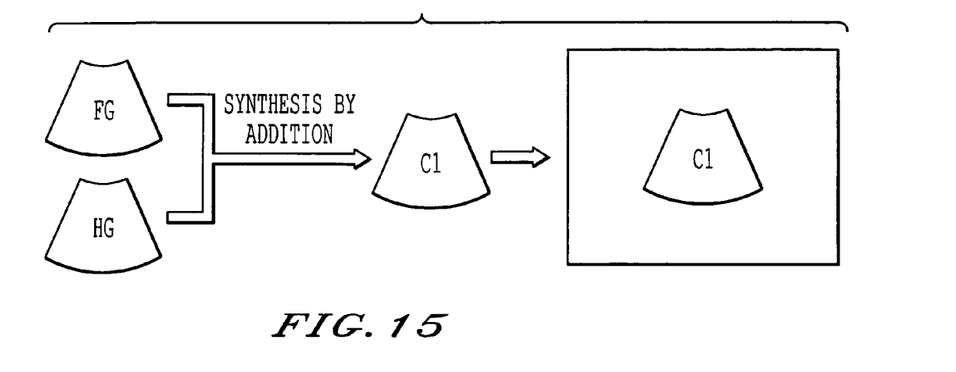
FIG. 15 illustrates a process of a First Display mode of the invention.

In the first display mode, as shown in FIG. 15, the image processing unit 32 adds the gray-scale fundamental image data FG and the gray-scale harmonic image data HC pixel-by-pixel, thus generating one frame of synthetic image data C1. This synthetic image data C1 is converted by itself to one frame of display data.

Before inflow of a contrast medium, the tissue appearance can be visually confirmed on the fundamental image. After inflow of the contrast medium, the state of the inflow can be visually confirmed satisfactorily on the harmonic image.

Figure 17A:
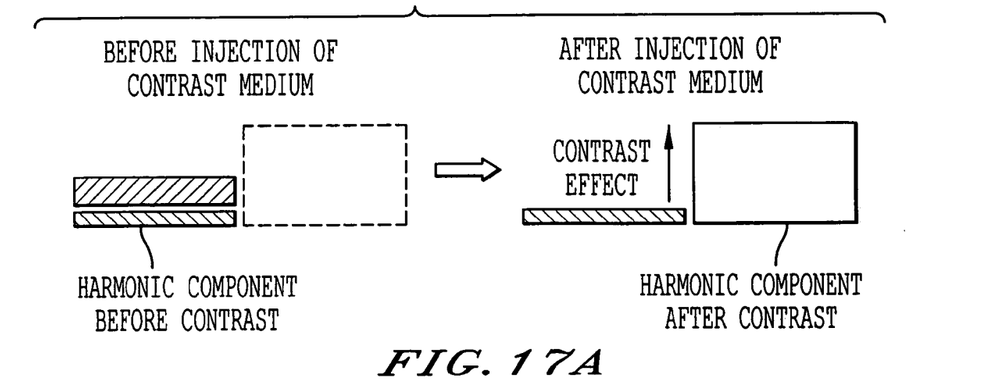
FIGS. 17A-17B illustrate an effect of a synthetic image in the First and Second Display modes.
Figure 17B:
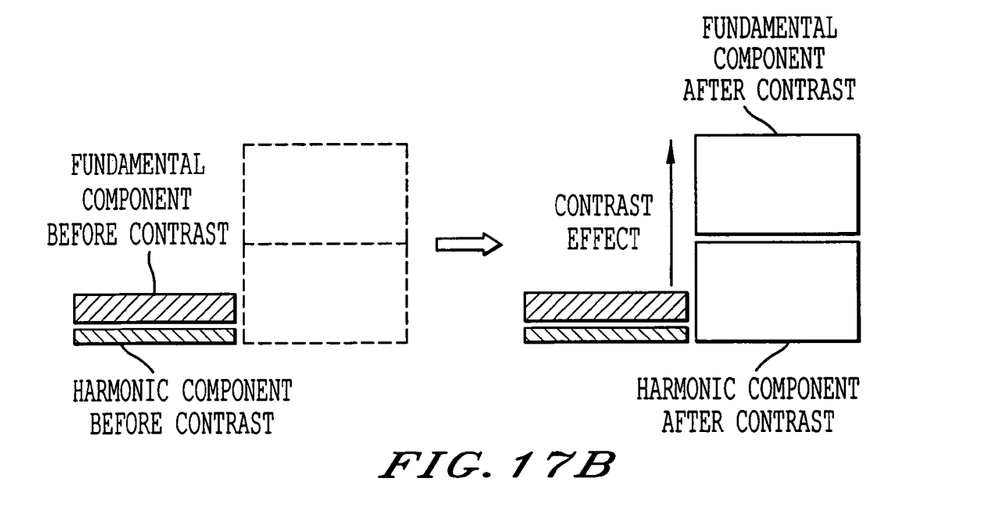

By adding the gray-scale fundamental image data FG and harmonic image data HG, it is possible to reinforce the increase in brightness due to the contrast effect more effectively than in the case of displaying the gray-scale harmonic image data HG alone, as shown in FIG. 17A. Since the amount of increase due to the contrast effect of the fundamental component is added to the amount of increase due to the contrast effect of the harmonic component in the displayed image, as shown in FIG. 17B, the increase in brightness is reinforced and the visibility of the contrast range is improved.

(Second Display Mode)

Figure 16:
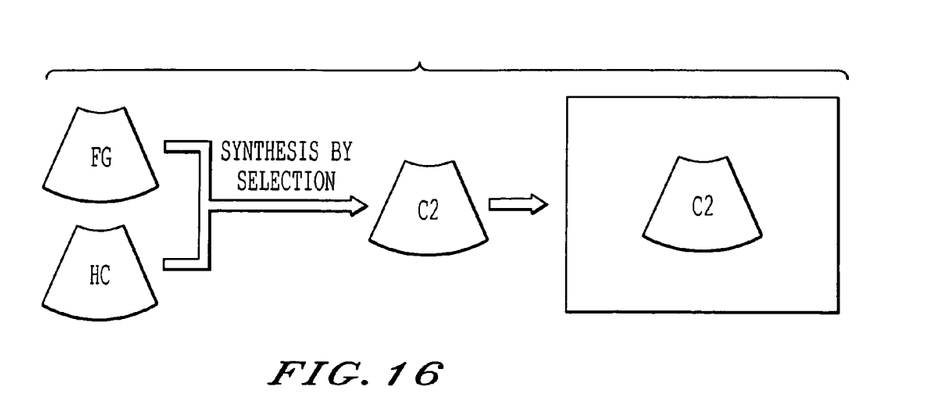
FIG. 16 illustrates a process of a Second Display made of the invention.

In the second display mode, as shown in FIG. 16, the image processing unit 32 partly synthesizes the gray-scale fundamental image data FG and the color harmonic image data HC, thus generating one frame of synthetic image data C2. Specifically, when the pixel brightness of the color harmonic image data HC exceeds 0 or its approximate value, the pixel brightness of the harmonic image data is selected as the pixel value of the pixel. When the pixel brightness of the harmonic image data does not exceed 0 or its approximate value, the pixel brightness of the fundamental image data is selected as the pixel value of the pixel. In other words, in a region where the harmonic component is generated, the harmonic image is displayed, whereas in a region where the harmonic component is not generated, the fundamental image is displayed.

By thus partly synthesizing the gray-scale fundamental image data FG and the color harmonic image data HC, it is possible to visually confirm the state of spatial spread of distribution of the harmonic component (contrast medium) satisfactorily on the color image. Moreover, even before or after inflow of the contrast medium, the tissue appearance can be visually confirmed on the basis of the fundamental component in the region where the harmonic component is not generated. Since the harmonic component and the fundamental component have different colors, these components can be easily identified.

(Third Display Mode)

Figure 18:
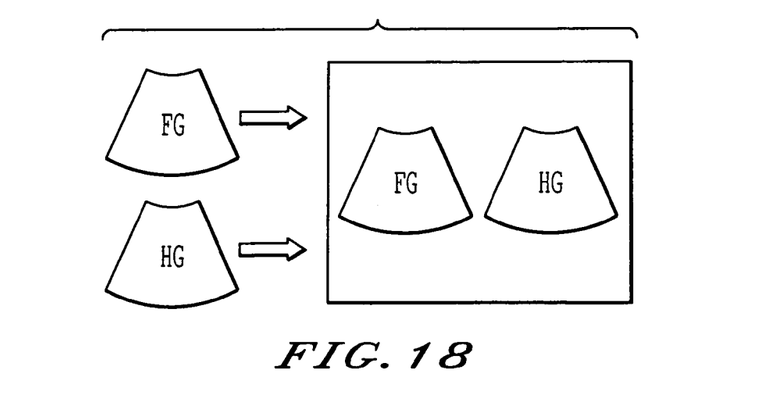
FIG. 18 illustrates a process of a Third Display mode of the invention.

In the third display mode, as shown in FIG. 18, the image processing unit 32 arranges the gray-scale fundamental image data FG and the gray-scale harmonic image data HG side by side within the same screen.

By thus simultaneously displaying the gray-scale fundamental image data FG and harmonic image data HG side by side, it is possible to observe both the distribution of the contrast medium (harmonic component) and the tissue appearance (fundamental component). Therefore, before inflow of the contrast medium, the tissue appearance can be confirmed mainly based on the fundamental image. After inflow of the contrast medium, the contrast effect can be confirmed using both the fundamental image and the harmonic image.

(Fourth Display Mode)

Figure 19:
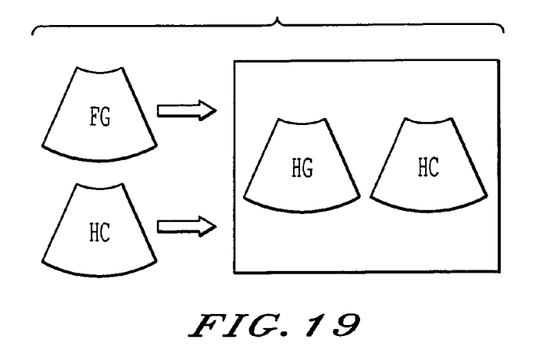
FIG. 19 illustrates a process of a Fourth Display mode of the invention.

In the fourth display mode, as shown in FIG. 19, the image processing unit 32 arranges the gray-scale fundamental image data FG and the color harmonic image data HC side by side within the same screen.

By thus simultaneously displaying the gray-scale fundamental image data FG and the color harmonic image data HC side by side, it is possible to observe both the distribution of the contrast medium (harmonic component) and the tissue appearance (fundamental component). Therefore, before inflow of the contrast medium, the tissue appearance can be confirmed mainly on the fundamental image. After inflow of the contrast medium, the contrast effect can be confirmed using both the fundamental image and the harmonic image.

(Fifth Display Mode)

Figure 20:
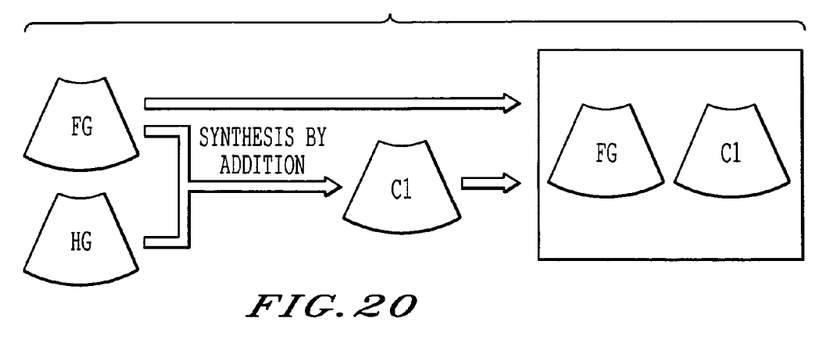
FIG. 20 illustrates a process of a Fifth Display mode of the invention.

In the fifth display mode, as shown in FIG. 20, the image processing unit 32 adds pixels of the gray-scale fundamental image data FG and the gray-scale harmonic image data HG, thus generating synthetic image data C1. The synthetic image data C1 and the gray-scale fundamental image data FG are arranged side by side within the same screen.

By thus simultaneously displaying the synthetic image data C1 and the gray-scale fundamental image data FG side by side, it is possible to improve the visibility of the tissue appearance in addition to the effect of the first display mode.

(Sixth Display Mode)

Figure 21:
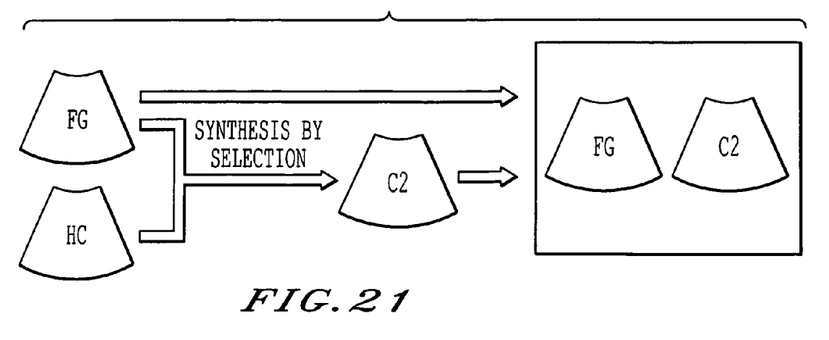
FIG. 21 illustrates a process of a Sixth Display mode of the invention.

In the sixth display mode, as shown in FIG. 21, the image processing unit 32 partly synthesizes the gray-scale fundamental image data FG and the color harmonic image data HC, thus generating synthetic image data C2. The synthetic image data C2 and the gray-scale fundamental image data FG are arranged side by side within the same screen.

By thus simultaneously displaying the synthetic image data C2 and the gray-scale fundamental image data FG side by side, it is possible to improve the visibility of the tissue appearance in addition to the effect of the second display mode.

(Seventh Display Mode)

Figure 22:
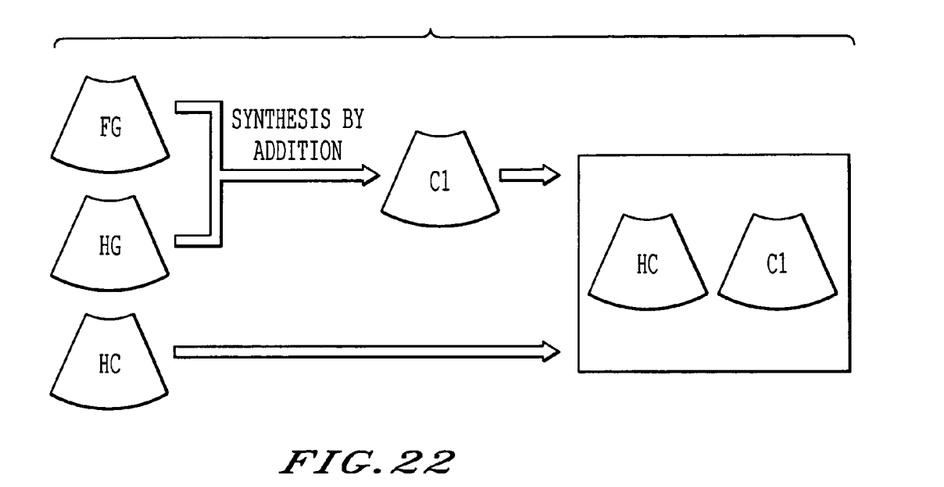
FIG. 22 illustrates a process of a Seventh Display mode of the invention.

In the seventh display mode, as shown in FIG. 22, the image processing unit 32 adds pixels of the gray-scale fundamental image data FG and the gray-scale harmonic image data HG, thus generating synthetic image data C1. The synthetic image data C1 and the color harmonic image data HC are arranged side by side within the same screen.

By thus simultaneously displaying the synthetic image data C1 and the color harmonic image data HC side by side, it is possible to improve the visibility of spatial distribution of the harmonic component, that is, spread of distribution of the contrast medium, in addition to the effect of the first display mode.

(Eighth Display Mode)

Figure 23:
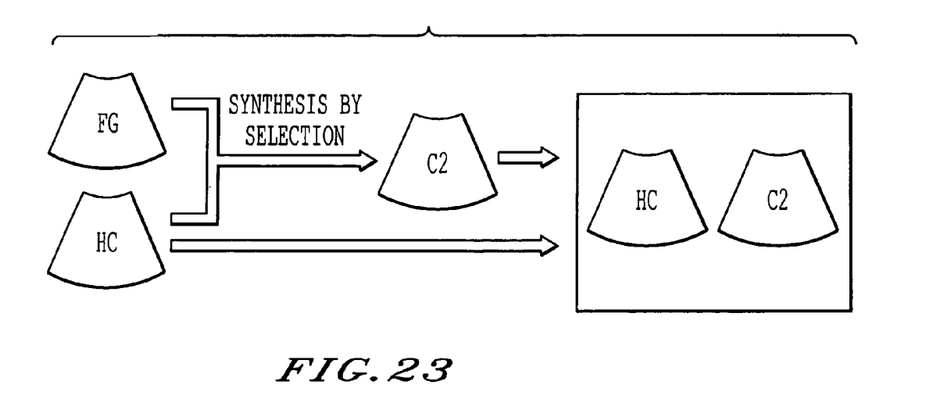
FIG. 23 illustrates a process of an Eighth Display mode of the invention.

In the eighth display mode, as shown in FIG. 23, the image processing unit 32 partly synthesizes the gray-scale fundamental image data FG and the color harmonic image data HC, thus generating synthetic image data C2. The synthetic image data C2 and the color harmonic image data HC are arranged side by side within the same screen.

By thus simultaneously displaying the synthetic image data C2 and the color harmonic image data HC side by side, it is possible to improve the visibility of spatial distribution of the harmonic component, that is, spread of distribution of the contrast medium, in addition to the effect of the second display mode.

This invention is not limited to the above-described embodiment and various modifications can be effected at embodiment stages without departing from the scope of the invention. Moreover, the embodiment includes various stages, and various inventions can be extracted by suitable combinations of the plural constituent elements disclosed herein. For example, of all the constituent elements disclosed in the embodiment, some constituent elements may be deleted.

What is claimed is:

1. An ultrasonic diagnostic apparatus for obtaining an ultrasonic image of an object body, comprising:

a transmitter configured to transmit an ultrasonic wave;

a receiver configured to receive an echo signal reflected from the object body in response to the ultrasonic wave and to generate a reception signal based on the echo signal;

a filter configured to adjust intensity of each of a fundamental component and a harmonic component from the reception signal by a filter characteristic, wherein an amplification of the harmonic component is larger than an amplification of the fundamental component, wherein a relative intensity of the harmonic component is adjusted to be larger than the intensity of the fundamental component;

an input unit configured to input a parameter for controlling a ratio of the amplification of the fundamental component and the amplification of the harmonic component by an operator;

an adjusting unit configured to adjust the ratio according to the parameter; and a display configured to display the ultrasonic image.

2. The ultrasonic diagnostic apparatus according to claim 1, wherein the filter comprises:

a digital complex filter having an asymmetric frequency characteristic.

3. An ultrasonic diagnostic method for obtaining an ultrasonic image of an object body, comprising:

transmitting an ultrasonic wave;

receiving an echo signal reflected from the object body in response to the ultrasonic wave and generating a reception signal based on the echo signal;

adjusting intensity of each of a fundamental component and a harmonic component from the reception signal by a filter characteristic, wherein an amplification of the harmonic component is larger than an amplification of the fundamental component, wherein a relative intensity of the harmonic component is adjusted to be larger than the intensity of the fundamental component;

inputting a parameter for controlling a ratio of the amplification of the fundamental component and the amplification of the harmonic component by an operator;

adjusting the ratio according to the parameter; and displaying the ultrasonic image.

* * * * *